US012567132B2

(12) United States Patent
Knowles-Barley et al.

(10) Patent No.: US 12,567,132 B2
(45) Date of Patent: Mar. 3, 2026

(54) AUTO GAMMA CORRECTION

(71) Applicant: VOLPARA HEALTH TECHNOLOGIES LIMITED, Wellington (NZ)

(72) Inventors: Seymour Francis Knowles-Barley, Wellington (NZ); Ralph Highnam, Wellington (NZ)

(73) Assignee: LUNIT INTERNATIONAL LIMITED, Wellington (NZ)

( * ) Notice: Subject to any disclaimer, the term of this patent is extended or adjusted under 35 U.S.C. 154(b) by 341 days.

(21) Appl. No.: 18/031,848

(22) PCT Filed: Oct. 11, 2021

(86) PCT No.: PCT/IB2021/059286
§ 371 (c)(1),
(2) Date: Apr. 13, 2023

(87) PCT Pub. No.: WO2022/079569
PCT Pub. Date: Apr. 21, 2022

(65) Prior Publication Data
US 2023/0394635 A1 Dec. 7, 2023

(30) Foreign Application Priority Data
Oct. 15, 2020 (GB) ...................................... 2016362

(51) Int. Cl.
*G06T 5/90* (2024.01)
*G06T 5/40* (2006.01)
*G06T 5/92* (2024.01)

(52) U.S. Cl.
CPC .................. *G06T 5/92* (2024.01); *G06T 5/40* (2013.01); *G06T 2207/10116* (2013.01)

(58) Field of Classification Search
None
See application file for complete search history.

(56) References Cited

U.S. PATENT DOCUMENTS

| | | | |
|---|---|---|---|
| 2012/0114236 A1 | 5/2012 | Finlayson | |
| 2018/0350045 A1* | 12/2018 | Kokubun | ............... A61B 5/055 |
| 2020/0020083 A1 | 1/2020 | Grilikhes | |

OTHER PUBLICATIONS

International Search Report issued in PCT/IB2021/059286, dated Jan. 27, 2022, 3 pgs.
Written Opinion of the International Searching Authority issued in PCT/IB2021/059286, dated Jan. 27, 2022, 7 pgs.

* cited by examiner

*Primary Examiner* — Joseph R Haley
(74) *Attorney, Agent, or Firm* — HOLLAND & HART LLP

(57) ABSTRACT

The present invention relates to automatic calibration of gamma value. In particular, it relates to automatically setting gamma value for the pre-processing of medical images, whereby the input image is standardised for the purpose of training machine learning models. The method is useful for useful for processing purposes to ensure that features may be identified reliably and consistently across different images by the same image processing methods.

14 Claims, 6 Drawing Sheets

Auto Gamma Corrected Image and ROI

Input Image

Auto Gamma Corrected Image

Input Image Histogram

Auto Gamma Corrected Image Histogram

Input Image

Auto Gamma Corrected Image

Input Image Histogram

Auto Gamma Corrected Image Histogram

Input Image and ROI

Auto Gamma Corrected Image and ROI

AUTO GAMMA CORRECTION

CROSS-REFERENCE TO RELATED APPLICATIONS

This is a national phase application of International Patent Application No. PCT/IB2021/059286, filed 11 Oct. 2021, which claims the benefit of GB Patent Application No. 2016362.2, filed 15 Oct. 2020, the disclosures of which are incorporated herein, in their entireties, by this reference.

FIELD OF THE INVENTION

The present invention relates to automatic calibration of gamma value. In particular, it relates to automatically setting gamma value for the pre-processing of medical images, whereby the input image is standardised for the purpose of training machine learning models.

BACKGROUND

Medical images captured by imaging systems such as x-ray, MRI, or ultrasound, can have different brightness and contrast properties compared to images captured by measuring visible light. For example, in x-ray images, 'brightness' (or pixel intensity) is proportional to the x-ray attenuation measured at the detector; and 'contrast' is the difference between highest and lowest pixel intensities across the image. Both brightness and contrast depend on several imaging properties, including x-ray tube voltage, detector sensitivity, exposure time and the thickness or constitution of the imaged body part. Due to differences in signal intensities, it is useful to pre-process medical images for display in visible light so that objects are easier to view and important areas of contrast, or brightness changes are easier to observe. Such image pre-processing thus increases the efficacy of medical imaging rendering diagnosis more consistent.

Gamma correction is one method for pre-processing images for the purposes of display or processing and is commonly used to calibrate imaging capture devices and image display devices. Gamma correction modifies the overall mean (or average) value of the pixel intensities of the output image relative to the input image. Gamma correction also gives some areas of the input image higher contrast and some areas lower contrast, based on the input image brightness.

Using a high gamma value when applying gamma correction reduces the distance between pixel values for high valued pixels and increases the distance between pixel values for low value pixels, thereby reducing the contrast for bright areas of the image and increasing contrast for darker areas of the image. Using a low gamma when applying gamma correction increases the contrast for bright areas of the image and reduces contrast for darker areas of the image.

Setting the appropriate gamma used to process images is useful for display purposes to ensure that appropriate parts of the image are displayed with enough contrast in pixel values so that important details and visual features can be observed in the image.

Setting the appropriate gamma is useful for processing purposes to ensure that features are identified reliably and consistently across different images by the same image processing methods, such as machine learning models.

Several methods are known for choosing gamma values based on image statistics from a single image, or from a region of interest.

For example, Babakhani et al ('Automatic gamma correction based on average of brightness', 2015) use a one-step calibration for gamma correction and image statistics are calculated over the entire image. Karuppanagounder et al ('Medical Image Contrast Enhancement based on Gamma Correction', 2011) use properties of the cumulative histogram to calculate the appropriate gamma value, within some bounds. Huang et al ('Efficient Contrast Enhancement Using Adaptive Gamma Correction with Weighting Distribution', 2012) describe a similar approach and Chiu et al ('Efficient Contrast Enhancement Using Adaptive Gamma Correction and Cumulative Intensity Distribution, 2012) use the cumulative distribution function, and the image histogram to automatically set the gamma value to use in gamma correction.

Common to such methods is one-step calculation of gamma. None of the methods have a specific target for the mean pixel value of a transformed image, they each calculate image statistics over the entire image.

Twari et al ('Brightness Preserving Contrast Enhancement of Medical Images Using Adaptive Gamma Correction and Homomorphic Filtering', 2016) applies the above method for gamma correction to medical images and adds a regional contrast enhancement step.

For machine learning (ML) purposes it is useful to have image inputs normalized to a standard input format. This can be repeated for every layer of a network in methods such as 'batch normalization', Batch normalization targets a particular mean and standard deviation for a batch of outputs and preserves the linearity of the inputs, without applying gamma correction, as presented by Ioffe et al ('Batch Normalization: Accelerating Deep Network Training by Reducing Internal Covariate Shift', 2015).

Medical images usually have a much higher dynamic range than natural images, as well as parameters dictated by constituents of the imaged body part (e.g. thickness, tissue type) and attenuation properties. For this reason, finding appropriate maximum, minimum, and gamma values for displaying or processing medical images can be difficult. For x-ray images the gamma value of one x-ray system may not match others, and depends on multiple factors and properties of the x-ray imaging system, the body part being imaged, and the region(s) of interest.

Having a method to automatically calibrate the gamma value to transform images to a consistent input space is thus useful for standardising input to machine learning models.

SUMMARY OF THE INVENTION

According to a first aspect of the invention there is a method for setting a gamma value to generate a transformed image data set of a single transformed image for use in preprocessing an image, comprising the steps of: iteratively deriving an updated gamma value ($\Gamma_{i+1}$) from an image data set of a single image from the previous iteration (i) to then derive an updated image data set of a single updated image for the updated iteration (i+1), and generating an output image by scaling the updated image data set for the final iteration that corresponds to at least one stop condition.

By the method, repetitive refinement of image data set (i+1) is achieved so that areas of contrast or brightness changes are more consistent and easier to observe.

Steps of the method may be performed on a single image basis. An image data set may be data of a single image. The updated image data set (i+1) may be data of a single updated image. A single image has important information, and the gamma value may generate a transformed image data set of a single transformed image. A signal output image may also be generated.

The method may include deriving initial values of an image data set (i=0) by normalizing values of an input image data set of a single image.

So, the method provides for automatically setting gamma value for the pre-processing of medical images, whereby the input image and/or output is standardised for the purpose of training machine learning models.

The method may include deriving values of the gamma function ($\Gamma$) for the image data set (i) including selecting an initial gamma value ($\Gamma_{i=0}$) for the data set (i=0) based on the initial values of image data set (i=0). The method may include applying the updated gamma value ($\Gamma_{i+1}$) to the values of a previous image data set (i) to obtain a value for the updated image data set (i+1). The method may include repeating the steps of deriving an updated gamma value ($\Gamma_{i+1}$) and applying the updated gamma value ($\Gamma_{i+1}$) until at least one stop condition is met.

Any of the image data sets may comprise values of properties of geometrically related pixels. The properties may be pixel intensities, gamma values and/or other properties. The pixels may make up an image or region of interest in the image.

Each pixel may have one or more associated property values. A property may be indicative of the whole image or a region of interest of selected pixels in the image. Each pixel may have its own value of a property. The properties could have digital values which could be in range from 0 to $2^n-1$ where n is the number of bits of a processer or memory device used to store and/or manipulate the image data sets.

An input image histogram may be generated from the input image data set or initial image data set. A gamma corrected image histogram may be generated from the updated image data set that corresponds to the at least one stop condition. In this way the gamma corrected image histogram may relate to the output image. By viewing the input image histogram adjacent to the gamma corrected image histogram the quantitative effect improvement or requirement for improvement may be visualised. Overlaying the image histogram of the updated image (i+1) on an image histogram of the input image data set may be done to gauge effectiveness of the updated gamma value.

The data set (i) may be generated to comprise a histogram of input pixel values correlated with a count of the pixel values. The histogram may be generated to comprise ranges of pixel values correlated with a count of pixels having pixel values in each range. The histogram may be generated by 'counting' and 'binning' for example with bins calculated at 256 bin centroids linearly distributed from minimum to maximum intensities of 0 to $2^n-1$ for n-bit images. An image histogram may show a plot of pixel intensities measured over all pixels in an image. A region of interest (ROI) may be segmented within an image, the brightness and contrast optimized within that region and a histogram of the segmented region used to automatically choose a gamma value. So, the method may use an iterative approach to normalize an image histogram to achieve a consistent average (i.e. mean) pixel value. A step may include segmenting a region of interest (ROI) from the updated image (i+1) and deriving the image histogram from the region of interest.

The extrema image data values may be set to encompass a selected set of values in the image data set (i). For example, the extrema values may be zero and $2^n-1$ or normalized to zero and one.

The image (i) may be refined by excluding from it data having a value equal to one or both extrema values. Data which has values within a certain percentage or distance from the extrema values may be excluded. The certain percentage may be one percent or five percent of the closest extrema value to the data or of the maximum or minimum extrema value. The image (i) may be refined before selecting the initial gamma value ($\Gamma_i$). Excluding data having a value too close to the extrema values may avoid a case wherein the method fails to converge.

The image data set (i) may be refined by excluding from it data values from outside a subregion of interest. Thus, the method may derive gamma values that enhance contrast within the subregion of interest where features may be important to clearly resolve.

The initial gamma value ($\Gamma_i$) for the data set (i=0) may be set to one. This initializes the method and represents the gamma value of an unmodified starting image from which the next updated gamma value ($\Gamma_{i+1}$) can be calculated. The updated gamma value ($\Gamma_{i+1}$) is likely to enhance the transformed image to resolve important features.

The stopping condition(s) may be or include a maximum number of repetitions of the steps of deriving and applying the updated gamma value ($\Gamma_{i+1}$). For some image data sets each repetition may have a diminished effect compared to the last in achieving a target value. Limiting the maximum number of repetitions keeps the process time reasonable.

The stopping condition(s) may be or comprise a maximum difference between the mean value of the updated image data set (i+1) and a target mean. The mean value of the image data set (i+1) corresponds to a level of contrast and brightness which may help to clarify critical features. Hence the mean of the output image matches the target mean within an accuracy corresponding to the difference.

The method may use an iterative method to ensure that the image histogram is normalized to have a consistent average pixel value to within a chosen level of accuracy.

Among other advantages, the output average pixel value for the full image, or a defined region of interest therein, may match the target average value to within any chosen level of accuracy rather than only approximating the target average value.

The gamma value may be calculated based on statistics from a targeted subregion or subset of pixels and the calculated gamma applied to the entire image in preference to using statistics from the entire image. The output image may be generated by applying the updated gamma value ($\Gamma_{i+1}$) that corresponds to the stop condition to the image data set (i) including the non-extrema values or the subregion values and the excluded image data values.

The updated gamma value ($\Gamma_{i+1}$) may be derived as a proportion of the current gamma value ($\Gamma_i$) by setting the proportion as the ratio of the logarithm of a target mean to the logarithm of the mean value of the image data set (i). In this way a balanced visual weight is given in the range between the extrema values to make the contribution of the whole image data set useable to close in on the target value.

According to another aspect of the invention there is a system to conduct the method described herein. The system may automatically set the gamma value used to pre-process medical images in order to generate consistently transformed images for training machine learning models.

The method may comprise four steps. In step 1 the input image may be normalized to the range between 0 and 1. In step 2 $image_0$ and $gamma_0$ values may be initialized for iteration (i=0). In step 3 a next candidate gamma value $gamma_{i+1}$ may be calculated and applied to $image_0$ to obtain the new image$_{i+1}$ based on values from the previous iteration. Step 3 may be repeated until stopping conditions are met. In step 4 the latest image$_i$ may be scaled back to the output range.

According to another aspect of the invention an output image is generated by the method described herein. The output image maybe stored in the system or transmitted from the system to a storage medium or an image visualizing device such as a printer or a screen.

Disclosure of the invention may also be found in the claims.

The invention will now be described, by way of example only, with reference to the accompanying figures in which:

DETAILED DESCRIPTION OF THE INVENTION

Figure 1A:
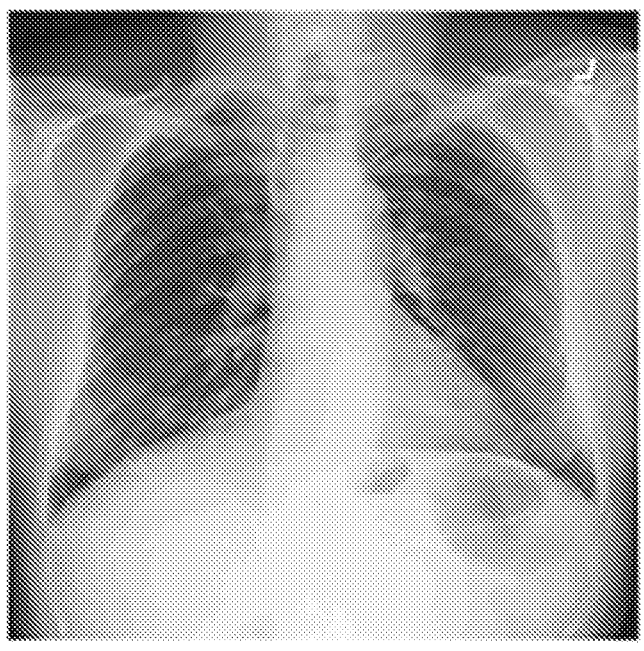
FIG. 1A shows a first example input image.
Figure 1B:
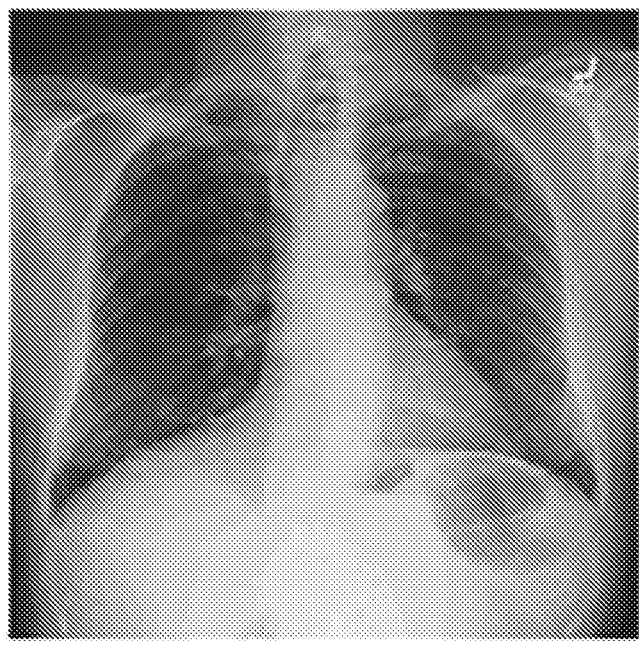
FIG. 1B shows a first gamma corrected image as a result of auto gamma correction applied to the full image of FIG. 1A, with a target output mean of 0.5 and a required target accuracy of 0.000001.
Figure 2A:
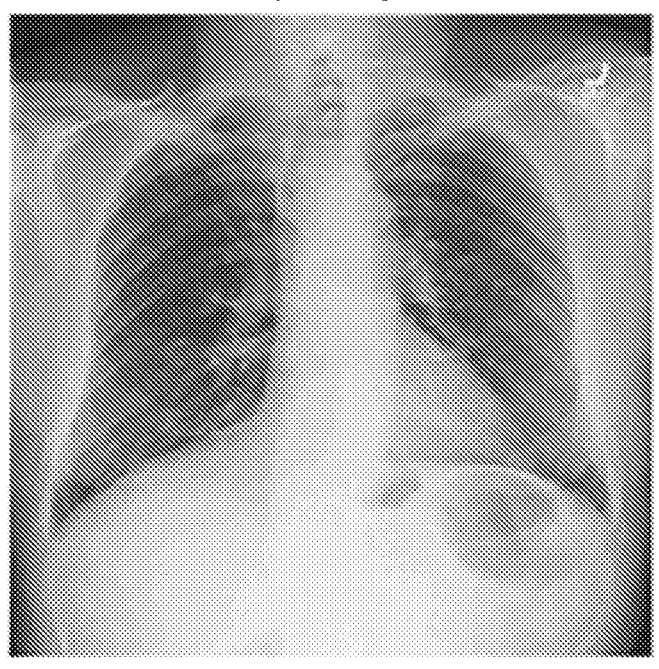
FIG. 2A shows a second example input image.
Figure 2B:
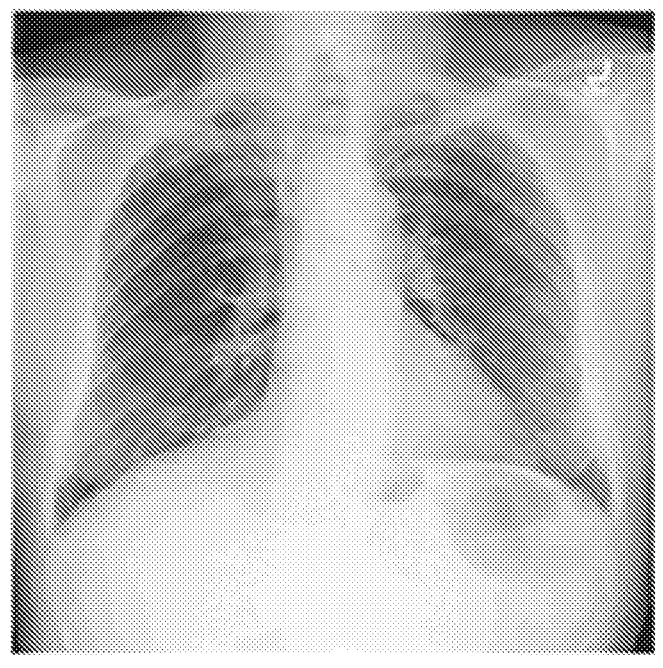
FIG. 2B shows a second gamma corrected image as a result of auto gamma correction applied to the full image of FIG. 2A, with a target output mean of 0.75 and a required target accuracy of 0.000001.
Figure 3A:
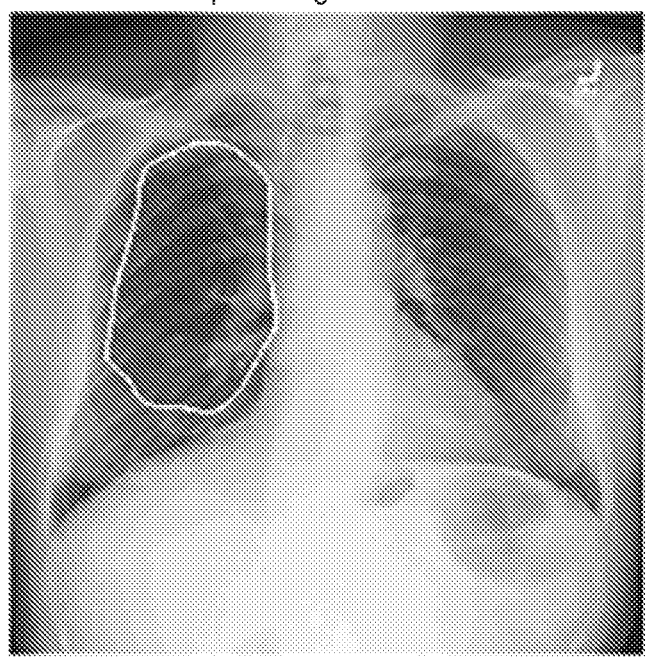
FIG. 3A shows a third example input image and a selected subregion ROI.
Figure 3B:
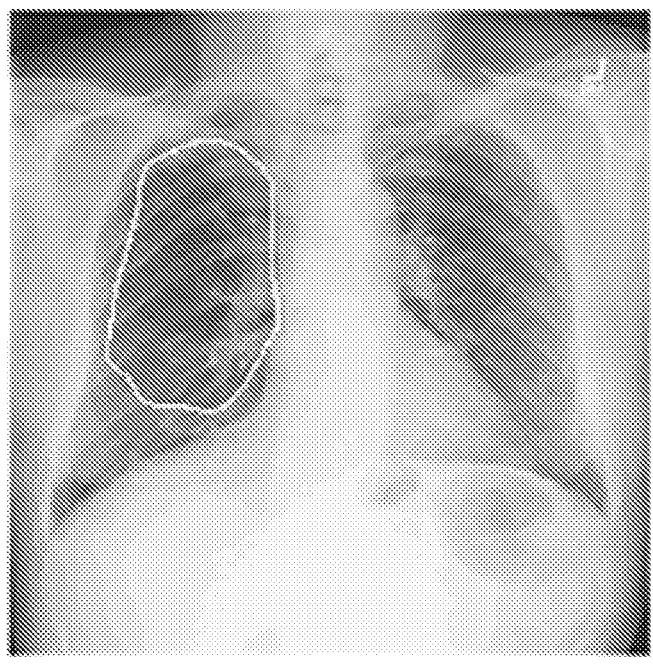
FIG. 3B shows a third gamma corrected image and selected subregion ROI as a result of auto gamma correction applied to the full image of FIG. 3A, with a target output mean of 0.5 based on statistics from the selected subregion ROI and a required target accuracy of 0.000001.

Effects of gamma correction can be seen by comparing the input images in FIGS. 1A, 2A, and 3A to the gamma corrected images in FIGS. 1B, 2B, and 3B. The gamma corrected images are also known as 'output' images. Gamma correction gives some areas of the input higher contrast and some areas lower contrast, based on the input brightness.

In the example shown by FIGS. 1A, 1B, 1C, and 1D, pixel values are decreased to achieve a mean pixel value of 0.5 times the full pixel range, over the entire image.

In the example shown by FIGS. 2A, 2B, 2C, and 2D, pixel values are increased to achieve a mean pixel value of 0.75 times the full pixel range, over the entire image.

In the example shown by FIGS. 3A, 3B, 3C, and 3D, pixel values are increased to achieve a mean value of 0.5 times the full pixel range, for the RO.

Figure 1C:
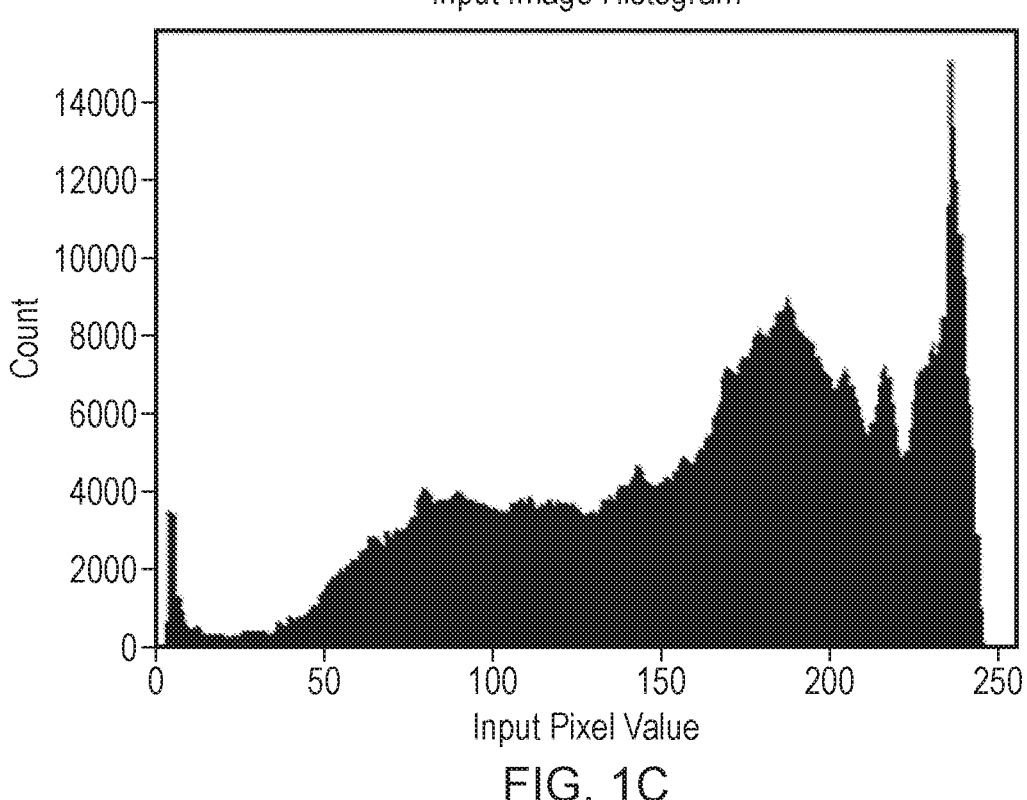
FIG. 1C shows an input image histogram of the input image shown in FIG. 1A.
Figure 2C:
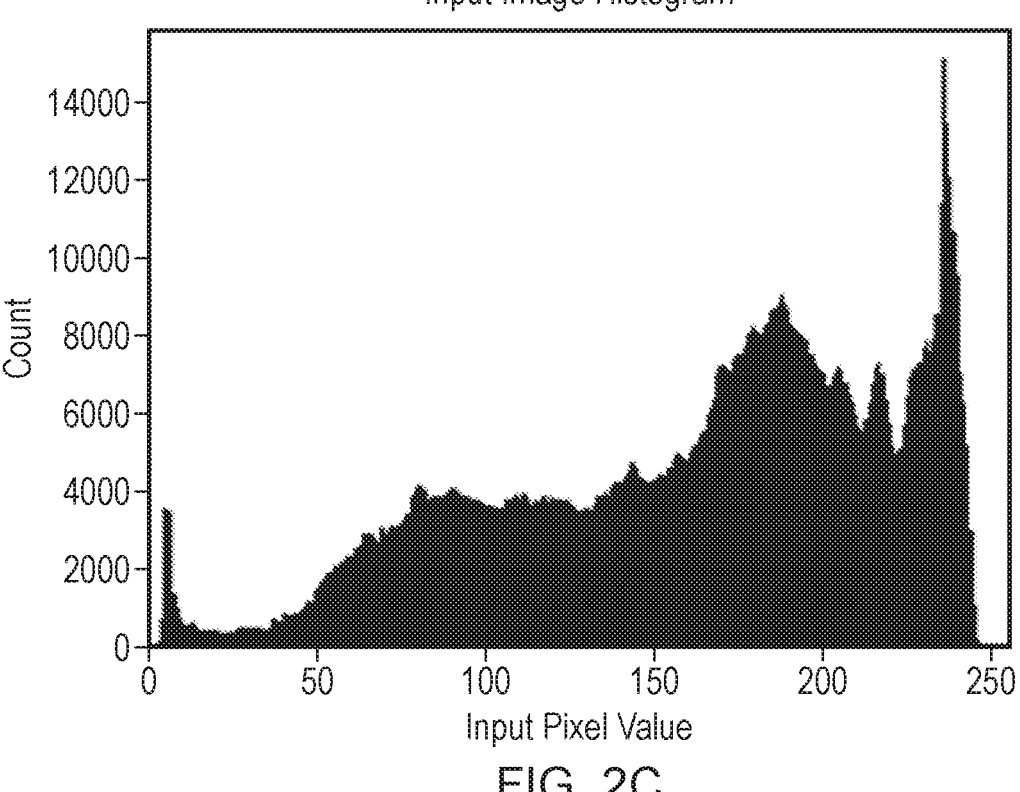
FIG. 2C shows an input image histogram of the input image shown in FIG. 2A.
Figure 3C:
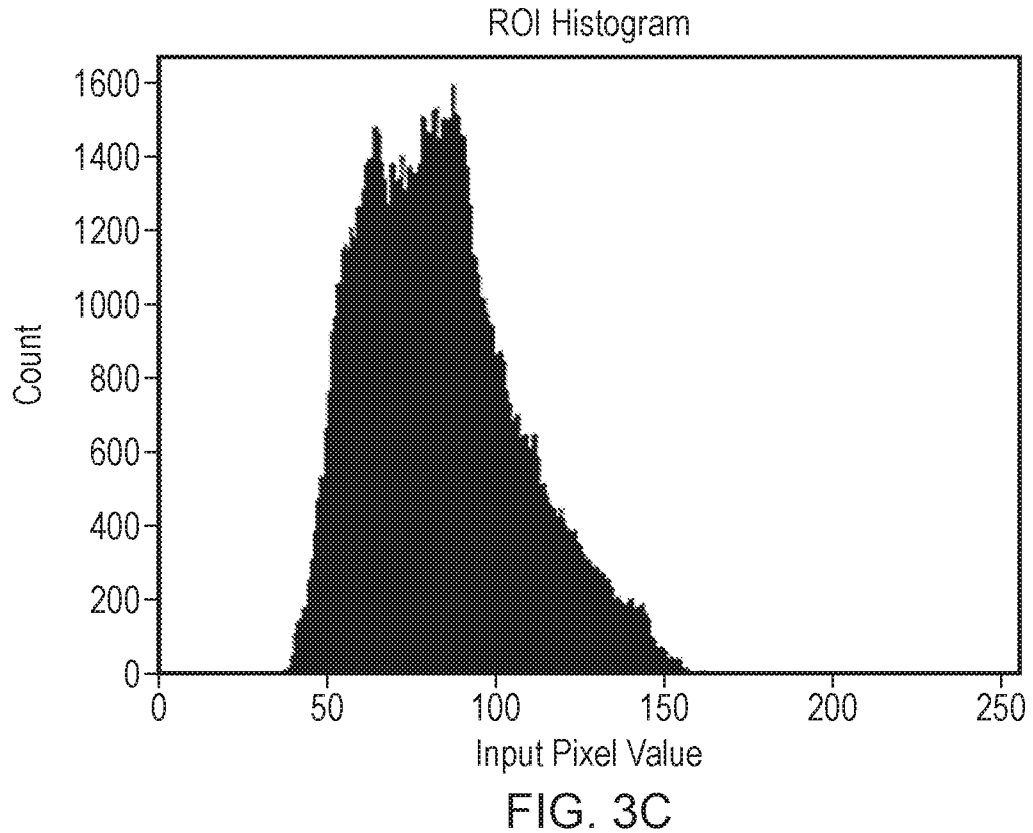
FIG. 3C shows an input image histogram of the subregion ROI shown in FIG. 3A.

FIGS. 1C, 2C show input image histograms of the input images FIGS. 1A, 2A respectively. FIG. 3C shows the input image histogram of the ROI in FIG. 3A. On the horizontal abscissa axis of the histograms are shown input pixel values. On the vertical ordinate axis is shown a count of each of the input pixel values.

Figure 1D:
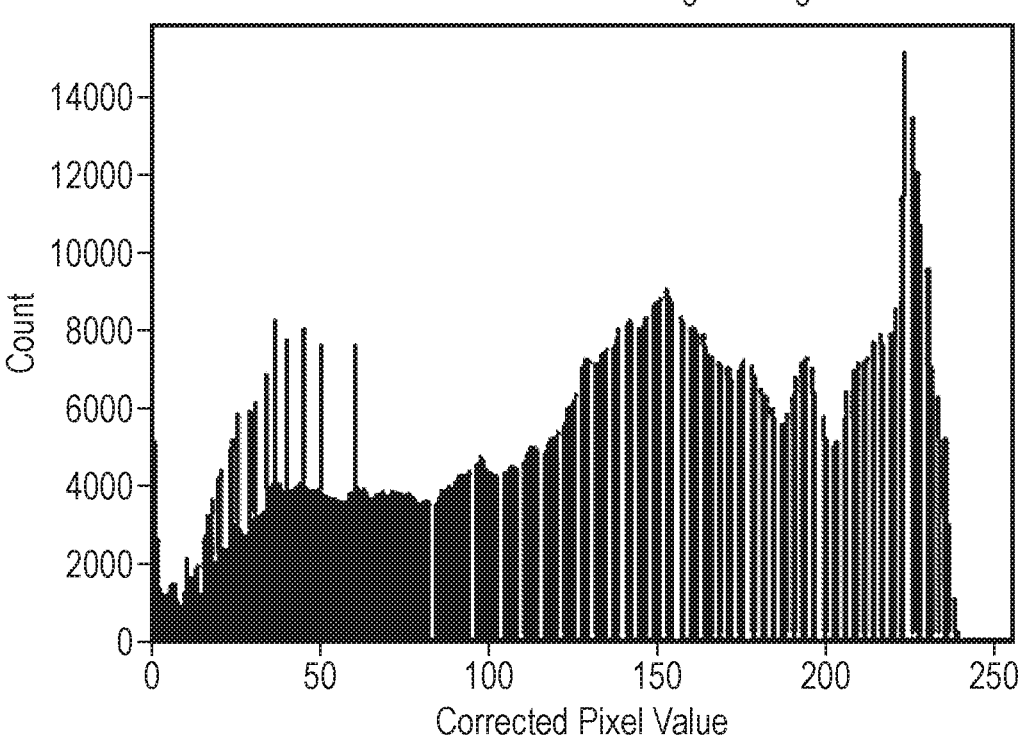
FIG. 1D shows a gamma corrected image histogram of the gamma corrected image in FIG. 1B.
Figure 2D:
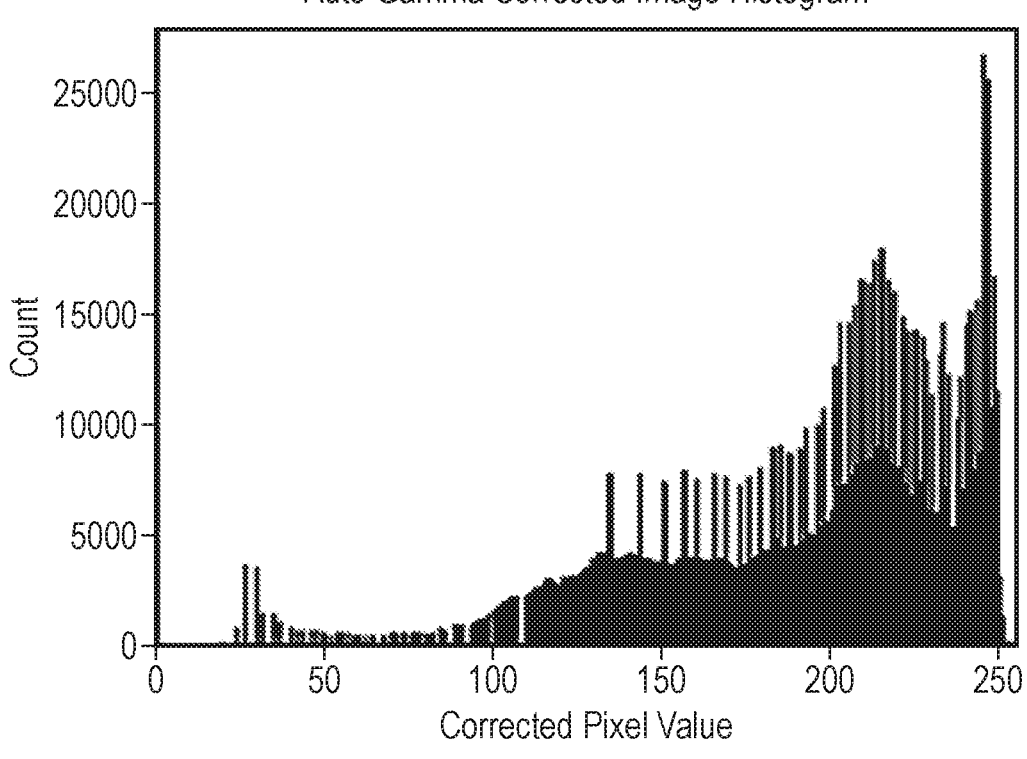
FIG. 2D shows a gamma corrected image histogram of the gamma corrected image in FIG. 2B.
Figure 3D:
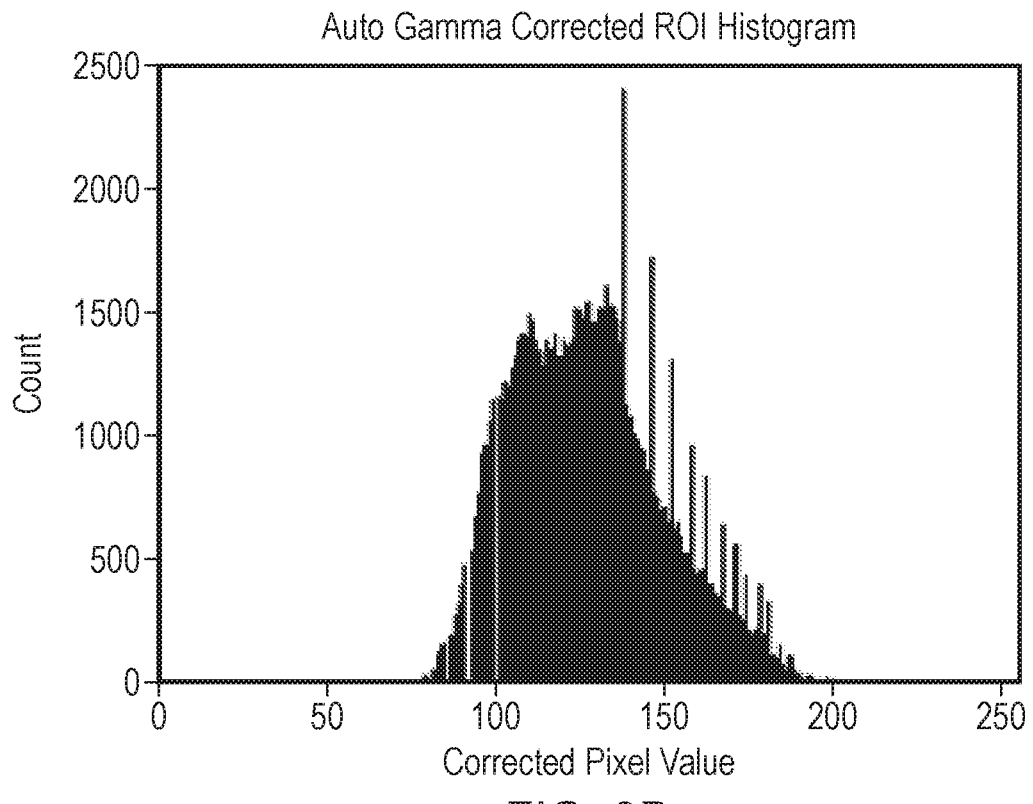
FIG. 3D shows a gamma corrected image histogram of the gamma corrected subregion ROI in FIG. 3B.

FIGS. 1D, 2D show gamma corrected image histograms of the gamma corrected images FIGS. 1B, 2B respectively. FIG. 3D shows the gamma corrected image histograms of the gamma corrected ROI in FIG. 3B. On the horizontal abscissa axis of the histograms are shown gamma corrected pixel values. On the vertical ordinate axis is shown a count of each of the gamma corrected pixel values.

The histograms show that gamma correction also modifies the overall mean (or average) value of the pixel intensities of the gamma corrected image relative to the input image. In an embodiment, an iterative method comprises:

inputs: input_image, target_mean, required_accuracy

1. Scale input_image to range between 0 and 1.
2. Set image$_0$=input_image and gamma$_0$=1
3. For each iteration i, starting at 1, repeatedly apply:

$$\text{gamma}_i = \text{gamma}_{i-1} \frac{\log(\text{target}_{mean})}{\log[\text{average}(\text{image}_{i-1})]}$$

$$\text{image}_i = pow(\text{image}_{i-1}, \text{gamma}_i),$$

wherein the function 'pow' raises image$_{i-1}$ to the power of gamma$_i$ Until the difference between average(image$_i$) and target_mean is less than required_accuracy.

Halt iterations if value average(image$_i$) fails to converge closer to target_mean than average(image$_{i-1}$).

Halt iterations if a maximum number of iterations is met.

4. Scale the latest image$_i$ back to desired range as the output image.

Through this iterative method we have found a gamma$_i$ such that mean of the output image$_i$ is as close to the target mean as desired, as defined by required_accuracy.

In an embodiment, where the majority of input_image are equal to the maximum or minimum value of the input range the method does not converge. In this circumstance, the method can be applied to the non-extrema values of the input image. For example, it is possible to define the segmentation of pixels that are not equal to 0 and not equal to 1, as input$_0$ and calculate gamma$_i$ and image$_i$ only using those values. In this case the average of not-extrema values is optimized to be equal to the target_mean and extrema values of 0 or 1 remain unchanged.

Similarly, if a subregion of the image is identified as the region of interest for processing or machine learning purposes, pixels from that subregion can used to calibrate gamma for the entire image. For example, pixels from the region of interest are defined as input$_0$, and in this case once a final gamma$_i$ is found the gamma transform is applied to the full image (not just the subregion).

This invention has been described by way of example only, modifications and alternatives will be apparent to those skilled in the art. All such embodiments and modifications are intended to fall within the scope of the claims.

The invention claimed is:

1. A method for setting a gamma value to generate a transformed image data set of a single transformed image for use in preprocessing an image, comprising steps of iteration comprising steps of:

deriving initial values of an image data set (i) by normalizing values of an input image data set of a single input image;

deriving values of a gamma function ($\Gamma$) for the image data set (i) including:

selecting an initial gamma value ($\Gamma_i$) for the data set (i) based on the initial values; deriving an updated gamma value ($\Gamma_{i+1}$) in respect of an updated (i+1) image data set of a single updated image (i+1);

applying the updated gamma value ($\Gamma_{i+1}$) to the values of a previous image data set (i) to obtain a value for the updated image data set (i+i);

repeating the steps of deriving an updated gamma value ($\Gamma_{i+1}$) and applying the updated gamma value ($\Gamma_{i+1}$) until at least one stop condition is met;

iterating normalizing an image histogram of the updated image data set (i+1) to achieve a chosen average pixel value; and generating an output image by scaling the updated image data set that corresponds to the at least one stop condition.

2. The method according to claim 1 comprising the steps of:

normalizing a selected set of values of the input image data set (i) encompassed by extrema image data values normalized to 0 and 1.

3. The method according to claim 1 comprising excluding from the initial values of the image data set (i=0) and its extrema image data values.

4. The method according to claim 1 comprising the step of:

excluding from the initial values of the image data set (i=0) and all image data values from outside of a subregion of interest.

5. The method according to claim 1, comprising the step of selecting the initial gamma value ($\Gamma_{i=0}$) for the data set (i=0) to be 1.

6. The method according to claim 1, comprising the step of: setting the stopping condition(s) to be or to include a maximum number of repetitions of the steps of iteration.

7. The method according to claim 1, comprising the step of setting the stopping condition(s) to include a maximum difference between a mean value of the image data set (i+1) and a target mean.

8. The method according to claim 1, comprising the step of deriving the updated gamma value ($\Gamma_{i+1}$) as a proportion of the current gamma value (H) by setting a proportion of X:Y as a ratio of the log of a target mean to a log of the mean value of the image data set (i).

9. The method according to claim 1, comprising the step of:

generating the output image by applying the gamma value ($\Gamma_{i+1}$) that corresponds to the stop condition to the image data set (i) including nonextrema values or image data values from a sub-region of interest and image data values from outside of a sub-region of interest.

10. The method according to claim 1 comprising the step of iteration of segmenting a region of interest (ROI) from the updated image (i+1) and deriving the image histogram from the region of interest.

11. The method of claim 1 of overlaying the image histogram of the updated image (i+1) on an image histogram of the input image data set to gauge effectiveness of the updated gamma value.

12. A system which implements the method according to claim 1.

13. The system according to claim 12 comprising a display screen to display the output image and/or histogram(s).

14. The system according to claim 12 comprising a medical x-ray imaging device to acquire the single input image.

* * * * *